United States Patent
Bavaria et al.

(10) Patent No.: US 8,423,584 B2
(45) Date of Patent: Apr. 16, 2013

(54) CONDITIONAL INCLUSION OF RESOURCES IN A COMPUTER SYSTEM CONFIGURATION

(75) Inventors: Priti Bavaria, Austin, TX (US); Andrew J. Geissler, Pflugerville, TX (US); Diane L. Knipfer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1378 days.

(21) Appl. No.: 12/117,015

(22) Filed: May 8, 2008

(65) Prior Publication Data

US 2009/0282229 A1    Nov. 12, 2009

(51) Int. Cl.
*G06F 17/30* (2006.01)
*G06F 9/44* (2006.01)

(52) U.S. Cl.
USPC .......................................... 707/803; 717/168

(58) Field of Classification Search .................. None
See application file for complete search history.

(56) References Cited

U.S. PATENT DOCUMENTS

| | | | |
|---|---|---|---|
| 5,802,338 A * | 9/1998 | Rechtschaffen et al. ..... 712/217 |
| 5,999,989 A * | 12/1999 | Patel ................................. 710/1 |
| 7,152,123 B2 | 12/2006 | Meyer et al. |
| 7,222,313 B2 | 5/2007 | Bullis et al. |
| 2004/0075067 A1 * | 4/2004 | McAuliffe ................. 250/559.4 |
| 2005/0102488 A1 | 5/2005 | Bullis |
| 2005/0198247 A1 * | 9/2005 | Perry et al. ..................... 709/223 |
| 2006/0170452 A1 * | 8/2006 | Benavides et al. .............. 326/37 |
| 2008/0040633 A1 * | 2/2008 | Kasubuchi et al. ............. 714/45 |
| 2008/0288739 A1 * | 11/2008 | Bamba et al. ................. 711/172 |

* cited by examiner

Primary Examiner — Tarek Chbouki
(74) Attorney, Agent, or Firm — Yee & Associates, P.C.; David A. Mims, Jr.

(57) ABSTRACT

Creating a device tree is provided. It is determined whether more than one version of a resource for a data processing system exists in a resource location code array table. In response to determining that more than one version of the resource for the data processing system does exist in the resource location code array table, it is determined which version of the resource was installed in the data processing system. A presence detection procedure is performed for the resource in the data processing system. It is determined whether the resource is present in the data processing system. In response to determining that the resource is present in the data processing system, an entry is created in a device tree for the resource based on the determined version of the resource. The device tree is cached in firmware.

19 Claims, 9 Drawing Sheets

RLCA TABLE
500

Enclosure
ev:1e00:p:i:l:Ufcs:u:.....

#Backplane
  bp:0800:p:i:l:Ufcs-P1:s:....

#Fan 1
    am:3a00:p:i:l:Ufcs-P1-A1:n:....

#Fan 2
    am:3a01:p:i:l:Ufcs-P1-A2:n:...

#Service Processor Card
    sp:0200:e:i:l:Ufcs-P1:s:.......

#Processor Card
    pf:1000:p:i:l:Ufcs-P1-C1:u:.....

#DIMM 1
      ms:d000:p:i:l:Ufcs-P1-C1-C1:u:,....

#DIMM 2
      ms:d001:p:i:l:Ufcs-P1-C1-C2:u:....

#DIMM 3
      ms:d002:p:i:C:1234:l:Ufcs-P1-C1-C3:u:....
                    502

#DIMM 4
      ms:d003:p:i:C:1234:l:Ufcs-P1-C1-C4:u:...
                    502

# GX Card
    be:0a00:p:i:l:Ufcs-P1-C2:u:...

etc.

FIG. 5

RLCA TABLE
600

```
#Enclosure
ev:1e00:p:i:l:Ufcs:u:.....

Backplane
  bp:0800:p:i:l:Ufcs-P1:s:....

Fan 1
    am:3a00:p:i:l:Ufcs-P1-A1:n:....

Fan 2
    am:3a01:p:i:l:Ufcs-P1-A2:n:...

Service Processor Card
    sp:0200:e:i:l:Ufcs-P1:s:.......

Processor Card
    pf:1000:p:i:l:Ufcs-P1-C1:u:.....

DIMM 1
      ms:d000:p:i:l:Ufcs-P1-C1-C1:u:,....

DIMM 2
      ms:d001:p:i:l:Ufcs-P1-C1-C2:u:....

DIMM 3
      ms:d002:p:i:C:1234.l:Ufcs-P1-C1-C3:u:....

#DIMM 4
602   ms:d003:p:i:C:1234:l:Ufcs-P1-C1-C4:u:...

# GX Card       604              606
    be:0a00:A:fstp/fspDDLevel,10:p:i:l:Ufcs-P1-C2:n:...
    be:0a00:A:fstp/fspDDLevel,20:p:i:l:Ufcs-P1-C2:u:...
                        608                    610
etc.
```

FIG. 6

RLCA TABLE
700

Enclosure
ev:1e00:p:i:l:Ufcs:u:.....
704

Backplane
   bp:0800:p:i:l:Ufcs-P1:s:....

Fan 1
      am:3a00:p:i:l:Ufcs-P1-A1:n:....

Fan 2
      am:3a01:p:i:l:Ufcs-P1-A2:n:...

Service Processor Card
      sp:0200:e:i:l:Ufcs-P1:s:.......

Processor Card
      pf:1000:p:i:l:Ufcs-P1-C1:u:.....

DIMM 1
         ms:d000:p:i:l:Ufcs-P1-C1-C1:u:,.....

DIMM 2
         ms:d001:p:i:l:Ufcs-P1-C1-C2:u:.....

DIMM 3
         ms:d002:p:i:C:1234:l:Ufcs-P1-C1-C3:u:....

DIMM 4
         ms:d003:p:i:C:1234:l:Ufcs-P1-C1-C4:u:...

GX Card
      be:0a00:A:fstp/fspDDLevel,10:p:i:l:Ufcs-P1-C2:n:...
      be:0a00:A:fstp/fspDDLevel,20:p:i:l:Ufcs-P1-C2:u:...

etc.

704    706
Enclosure
ev:1e01:CRID:1e00:AB02:p:i:l:Ufcs:u:.....
708     702

Backplane
   bp:0801:CRID:1e00:AB02:p:i:l:Ufcs-P1:s:....

Fan 1
      am:3a02:CRID:1e00:AB02:p:i:l:Ufcs-P1-A1:n:....

Fan 2
      am:3a03:CRID:1e00:AB02:p:i:l:Ufcs-P1-A2:n:...

etc...

CONDITIONAL INCLUSION OF RESOURCES IN A COMPUTER SYSTEM CONFIGURATION

BACKGROUND OF THE INVENTION

1. Field of the Invention

The present invention relates generally to an improved data processing system and more specifically to a computer implemented method, system, and computer-usable program code for conditional inclusion of resources in a computer system configuration.

2. Description of the Related Art

Complex computer systems are becoming more and more the standard in today's marketplace each day. Firmware, which supports these complex computer system configurations, also is becoming more and more complex. This firmware must support a variety of these complex computer system configurations within one code load. In addition, this firmware must always have an internal representation of the resources present in the computer system. Further, this firmware must build this internal representation of the resources present in the computer system based on vital product data (VPD) collected from the resources throughout the system.

Each individual resource, or field replaceable unit (FRU), within a computer system stores within it specific VPD, which describes other resources that may plug into the resource. This resource specific VPD includes wiring and access information in order for the firmware to determine how to get to the next resource. This VPD is programmed into the resource at the time the resource is manufactured.

Making changes to this VPD after the resource has shipped from the manufacturer is very complex in a lab environment. Making changes to this VPD in a customer environment is not allowed. Thus, the only way to update this resource specific VPD in the field is to replace the entire resource.

Creating an internal representation of the resources present in the computer system within a binary data file and then parsing this binary data file to determine the correct wiring paths has become more and more complex. In addition, this process has resulted in a large code bloat. Moreover, because of this ever increasing complexity more defects occur in this bloated code.

BRIEF SUMMARY OF THE INVENTION

According to one embodiment of the present invention, creation of a device tree for a data processing system is provided. It is determined whether more than one version of a resource for a data processing system exists in a resource location code array table. In response to determining that more than one version of the resource for the data processing system does exist in the resource location code array table, it is determined which version of the resource was installed in the data processing system. A presence detection procedure is performed for the resource in the data processing system. It is determined whether the resource is present in the data processing system. In response to determining that the resource is present in the data processing system, an entry is created in a device tree for the resource based on the determined version of the resource. The device tree is cached in firmware.

BRIEF DESCRIPTION OF THE SEVERAL VIEWS OF THE DRAWINGS

FIG. 9B is a flowchart illustrating an exemplary process for creating a device tree that includes optional versions of a resource in accordance with an illustrative embodiment.

DETAILED DESCRIPTION OF THE INVENTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer-usable or compute-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
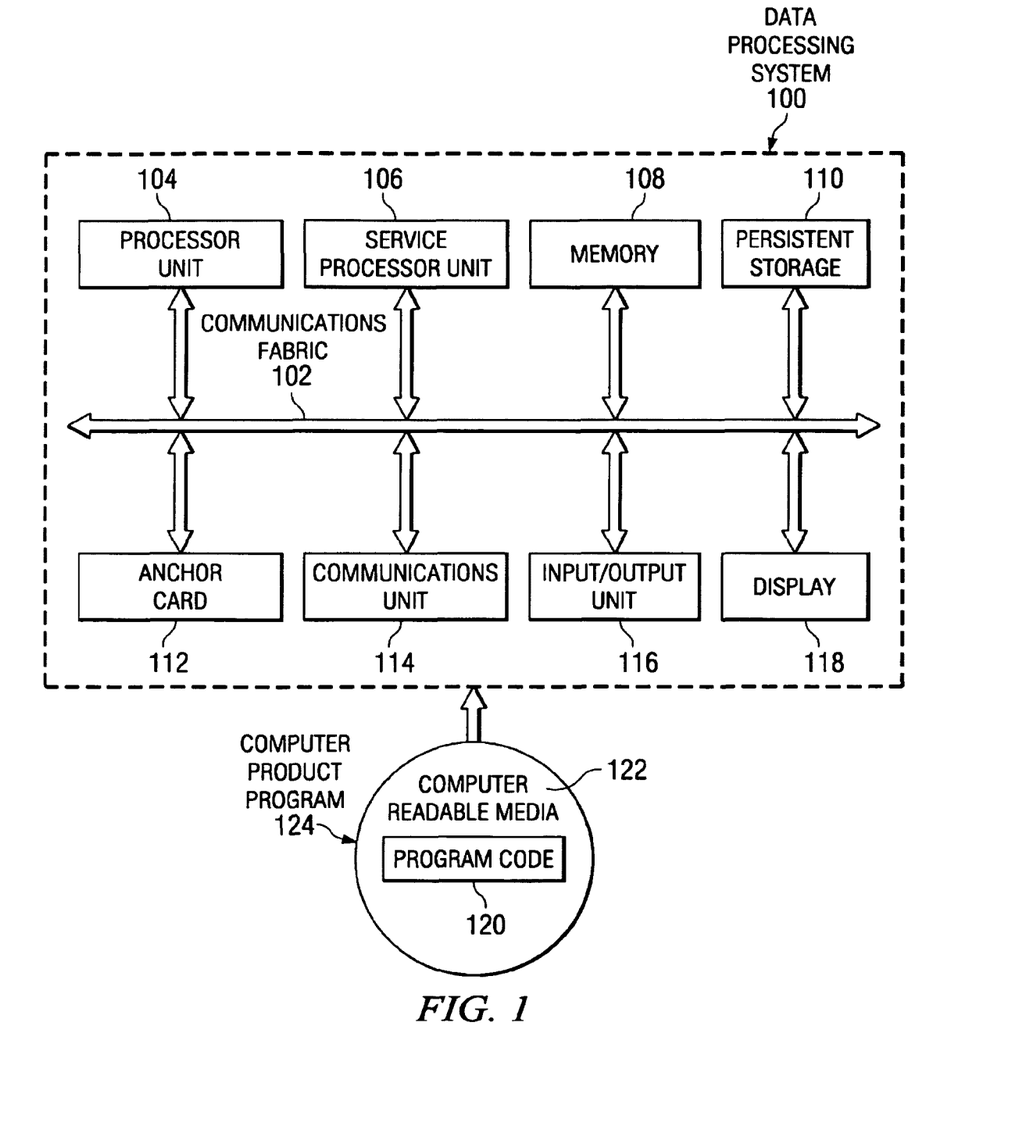
FIG. 1 is a diagram of a data processing system in which illustrative embodiments may be implemented.
Figure 2:
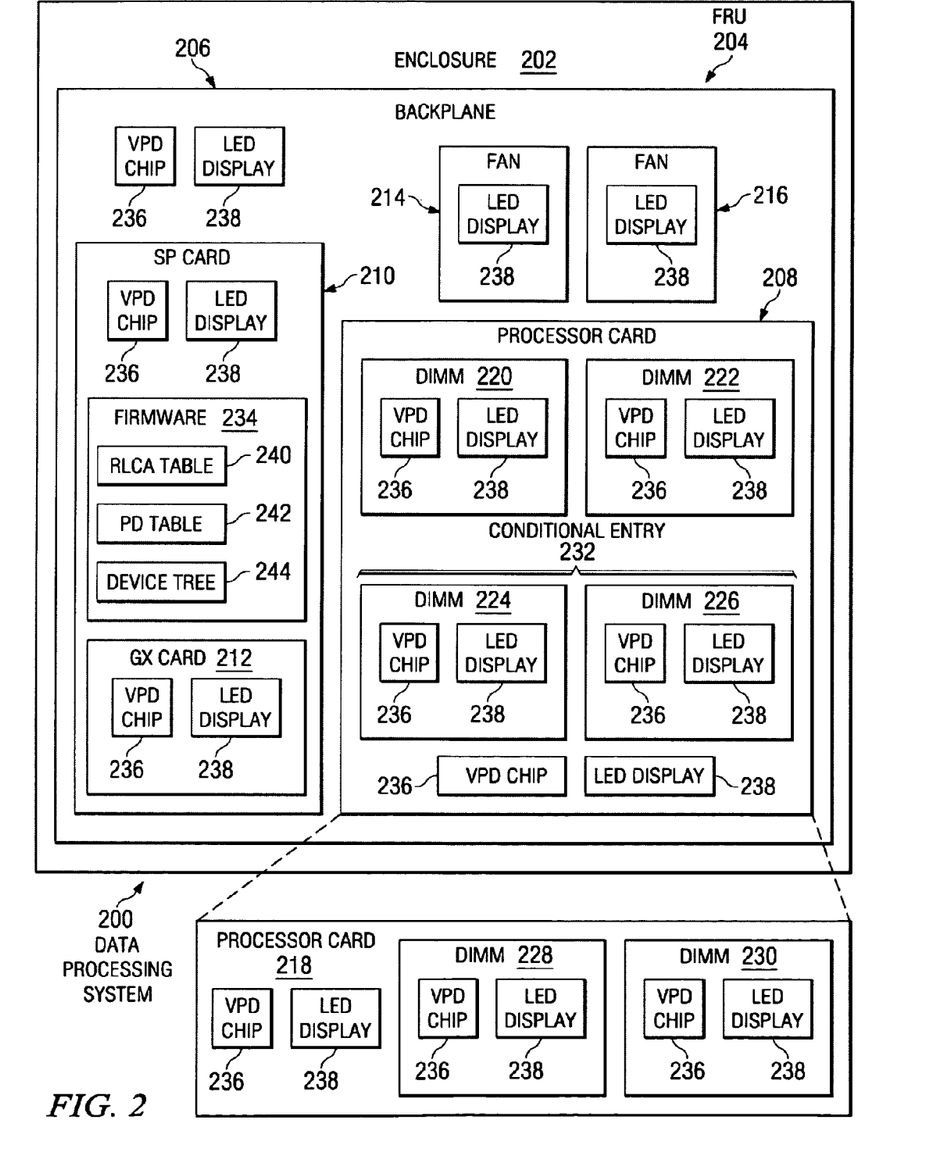
FIG. 2 is a block diagram of a data processing system in accordance with an illustrative embodiments.
Figure 3:
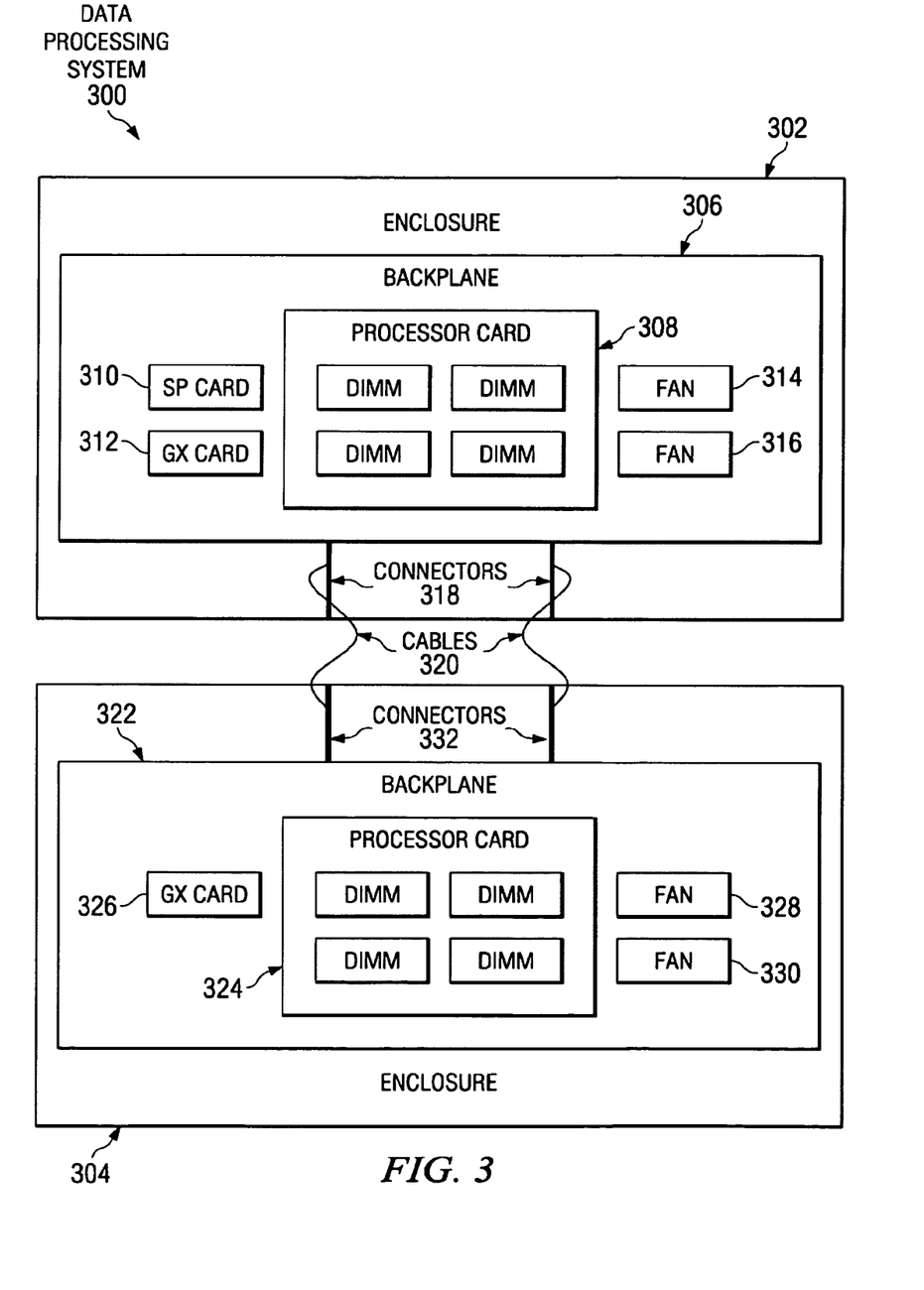
FIG. 3 is a block diagram of a data processing system with two enclosures optionally coupled together in accordance with an illustrative embodiment.

With reference now to the figures and in particular with reference to FIGS. 1-3, exemplary diagrams of data processing environments are provided in which illustrative embodiments may be implemented. It should be appreciated that FIGS. 1-3 are only exemplary and are not intended to assert or imply any limitation with regard to the environments in which different embodiments may be implemented. Many modifications to the depicted environments may be made.

FIG. 1 depicts a diagram of a data processing system in which illustrative embodiments may be implemented. In this illustrative example, data processing system 100 includes communications fabric 102, which provides communications between processor unit 104, service processor (SP) unit 106, memory 108, persistent storage 110, anchor card 112, communications unit 114, input/output (I/O) unit 116, and display 118. Processor unit 104, SP unit 106, memory 108, persistent storage 110, anchor card 112, communications unit 114, input/output (I/O) unit 116, and display 118 are examples of FRUs.

FRUs may be circuit boards, parts, or assemblies that may be quickly and easily added to or removed from data processing system 100. Typically, FRUs include motherboards, central processing units (CPUs), random access memory (RAM) modules, system drives, such as floppy drives, hard disk drives, and optical drives, bus devices, such as video cards and sound cards, power supply units, cooling fans, and peripherals, such as keyboards, mice, printers, and the cables connecting them. A user or technician may add or remove certain of these FRUs while data processing system 100 is in a standby state.

Processor unit 104 serves to execute instructions for software that may be loaded into memory 108. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

SP unit 106 provides diagnostics, booting, initialization, configuration, and run time error detection and correction for data processing system 100. Memory 108 and persistent storage 110 are examples of storage devices. A storage device is any piece of hardware that is capable of storing information either on a temporary basis and/or a permanent basis. Memory 108, in these examples, may be, for example, a random access memory or any other suitable volatile or non-volatile storage device.

Persistent storage 110 may take various forms depending on the particular implementation. For example, persistent storage 110 may contain one or more components or devices. For example, persistent storage 110 may be a hard drive, a flash memory, a rewritable optical disk, a rewritable magnetic tape, or some combination of the above. The media used by persistent storage 110 also may be removable. For example, a removable hard drive may be used for persistent storage 110.

Anchor card 112 contains the VPD for data processing system 100. VPD is a collection of configuration and informational data about a system, device, or resource. Typically, VPD information may include system type, a product model number, a unique serial number, product release level, maintenance level, and other information specific to the device type. Also, VPD may include user-defined information, such as device location. Anchor card 112 may, for example, be located in the same position on all system types. Illustrative embodiments utilize anchor card 112 to determine the system type of data processing system 100.

Communications unit 114, in these examples, provides for communications with other data processing systems or devices. In these examples, communications unit 114 is a network interface card. Communications unit 114 may provide communications through the use of either or both physical and wireless communications links.

Input/output unit 116 allows for input and output of data with other devices that may be connected to data processing system 100. For example, input/output unit 116 may provide a connection for user input through a keyboard and mouse. Further, input/output unit 116 may send output to a printer. Display 118 provides a mechanism to display information to the user or technician.

Instructions for the operating system (OS) and applications or programs are located on persistent storage 110. These instructions may be loaded into memory 108 for execution by processor unit 104. The processes of the different embodiments may be performed by processor unit 104 using computer implemented instructions, which may be located in a memory, such as memory 108. These instructions are referred to as program code, computer-usable program code, or computer-readable program code that may be read and executed by a processor in processor unit 104. The program code in the different embodiments may be embodied on different physical or tangible computer-readable media, such as memory 108 or persistent storage 110.

Program code 120 is located in a functional form on computer-readable media 122 that is selectively removable and may be loaded onto or transferred to data processing system 100 for execution by processor unit 104. Program code 120 and computer-readable media 122 form computer program product 124 in these examples. In one example, computer-readable media 122 may be in a tangible form, such as, for example, an optical or magnetic disc that is inserted or placed into a drive or other device that is part of persistent storage 110 for transfer onto a storage device, such as a hard drive that is part of persistent storage 110. In a tangible form, computer-readable media 122 also may take the form of a persistent storage, such as a hard drive, a thumb drive, or a flash memory that is connected to data processing system 100. The tangible form of computer readable media 122 is also referred to as computer recordable storage media. In some instances, computer readable media 122 may not be removable.

Alternatively, program code 120 may be transferred to data processing system 100 from computer-readable media 122 through a communications link to communications unit 114 and/or through a connection to input/output unit 116. The communications link and/or the connection may be physical or wireless in the illustrative examples. The computer-readable media also may take the form of non-tangible media, such as communications links or wireless transmissions containing the program code.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 may be varied from the illustrative examples shown.

As one example, a storage device in data processing system 100 is any hardware apparatus that may store data. Memory 108, persistent storage 110 and computer-readable media 122 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 108 or a cache such as found in an interface and memory controller hub that may be present in communications fabric 102.

Illustrative embodiments provide a computer implemented method, system, and computer usable program code for creating a device tree for a data processing system that includes conditional inclusion of resource entries. First, a service processor (SP) determines whether more than one version of a resource for a data processing system exists in a resource location code array table. In response to determining that more than one version of the resource for the data processing system does exist in the resource location code array table, the SP determines which version of the resource was installed in the data processing system. Then, the SP performs a presence detection procedure for the resource in the data processing system. Afterward, the SP determines whether the resource is present in the data processing system. In response to determining that the resource is present in the data processing system, the SP creates an entry in a device tree for the resource based on the determined version of the resource. Finally, the SP caches the device tree in firmware.

For a single firmware code stack to support a variety of computer hardware platforms, illustrative embodiments use the firmware to build a device tree that represents parent/child relationships of the hardware on which the firmware is currently running, rather than relying on fixed hardware configuration tables. Illustrative embodiments build this device tree by starting at a known location, such as a system enclosure, reading VPD from a nonvolatile storage device, such as a VPD chip, that is located on a backplane in the enclosure. Illustrative embodiments use this system enclosure and backplane as a base and with the various resource cards, modules, and functions, which are either permanently mounted on the backplane or plug into the backplane, as branches on the device tree.

Further, in addition to having all the resources that are physically present in the data processing system represented in the device tree, illustrative embodiments also represent other optional resources in the device tree that may physically be added to the data processing system, but are not currently installed in the system. For example, a data processing system may have slots for 8 dual inline memory modules (DIMMs), but only 4 DIMMs are currently installed. As a result, the device tree shows that 8 DIMMs are possible and identifies which 4 of the DIMMs are actually installed. In order for the firmware to build such a device tree, the firmware needs to know not only which resources are present in the system, but also which resources could possibly be present in the system.

The static table in firmware code, which is used to describe the parent/child relationships of the resources within a data processing system, is called a resource identification location code array (RLCA) table. Within entries in the RLCA table, illustrative embodiments define resources in such a way as to describe the characteristics necessary to determine if the resource entry is to be included in the device tree or not. This results in "conditional" entries in the RLCA table. In addition, illustrative embodiments incorporate these conditional entries into other static tables, such as hardware VPD address tables, presence detect (PD) tables, and light emitting diode (LED) control tables, to address resource VPD chips, to do resource presence detection, and to access LED displays on the resources.

The advantage of utilizing conditional entries is that conditional entries allow one single static RLCA table to represent each data processing system model, thus minimizing the number of static RLCA tables required to support a data processing system product family. Without these conditional entries, each system sub-model may require a separate RLCA table. In most cases, the majority of resource entries in the RLCA table are not conditional entries.

Therefore, including a few conditional entries in an RLCA table will not greatly increase the size of the table. In addition, these conditional entries in the RLCA table will require very little of the valuable space in the flash memory space of the SP. Similarly, the other tables used for addressing VPD chips, accessing LED displays, and performing resource presence detection also benefit by not requiring multiple copies of the tables to handle the various resource variations.

Illustrative embodiments utilize three types of conditional entries in the set of tables for a data processing system. A type 1 conditional entry for a resource is an entry that is included in a resulting device tree only when a customer card identification number (CCIN) of the resource's parent resource is listed in the conditional entry. In other words, this type of conditional entry is conditional on the parent resource. Also, it should be noted that resources that are functionally equivalent will have the same CCIN. A type 2 conditional entry for a resource is an entry that is included in the resulting device tree only when the value of a specified entry in the SP's registry is greater than or equal to the value in the conditional statement. A type 3 conditional entry for a resource is an entry that is included in the resulting device tree only when the CCIN of a specified resource ID (RID) is listed in the conditional entry. In other words, this type of conditional entry is not conditional on the parent resource.

With reference now to FIG. 2, a block diagram of a data processing system is depicted in accordance with an illustrative embodiments. Data processing system 200 may, for example, be implemented in data processing system 100 of FIG. 1. Data processing system 200 includes enclosure 202. Enclosure 202 is a mechanical support structure that supports and electrically connects the hardware components of data processing system 200. Enclosure 202 includes FRU 204. However, it should be noted that enclosure 202 may include a plurality of FRUs.

FRU 204 is an example of a resource that may be plugged into or unplugged from data processing system 200. FRU 204 includes backplane 206. In this example, backplane 206 is a circuit board, such as a printed circuit board. Backplane 206 electrically interconnects components attached to backplane 206. Also in this example, SP card 210 is an embedded resource, which is part of backplane FRU 206. In addition, processor card 208 or processor card 218, GX card 212, fan 214, and fan 216 are FRUs, which plug into backplane FRU 206. In other words, FRU 204 is an example of an FRU that is comprised of a plurality of resources and supports a plurality of child FRUs Furthermore, FRU 204 may optionally include processor card 218 instead of processor card 208. In other words, either processor card 208 or processor card 218 may be installed in data processing system 200. Processor card 208 and optional processor card 218 represent one or more main processing units. Processor card 208 and optional processor card 218 may, for example, be processing unit 104 in FIG. 1.

It should be noted that processor card 208 includes DIMMs 220, 222, 224, and 226. In addition, processor card 218 includes DIMMs 228 and 230. In other words, processor card 208 and processor card 218 are optional processor cards for data processing system 200 with different numbers of DIMMs attached. In this example, DIMMs 224 and 226 comprise conditional entry 232. DIMMs 224 and 226 are listed as conditional entries because without DIMMs 224 and 226, processor card 208 is essentially the same as processor card 218.

SP card 210 provides diagnostics, booting, initialization, configuration, and run time error detection and correction for data processing system 200. SP card 210 may, for example, be SP unit 106 in FIG. 1. SP card 210 includes firmware 234. Firmware 234 is microcode that is embedded in SP card 210. The microcode may, for example, perform collection of VPD from resources in the data processing system during a genesis boot of SP card 210 or recollection of the VPD during an initial program load (IPL) at power on of data processing system 200. GX card 212 is an example of an input/output (I/O) hub module that may provide I/O communications capabilities for data processing system 200.

Backplane 206, processor card 208, processor card 218, SP card 210, GX card 212, and DIMMs 220, 222, 224, 226, 228, and 230 all include VPD chip 236. VPD chip 236 is a microchip that contains VPD for whatever resource VPD chip 236 is attached to. In other words, VPD chip 236 contains VPD for backplane 206, processor card 208, processor card 218, SP card 210, GX card 212, and DIMMs 220, 222, 224, 226, 228, and 230. However, it should be noted that in this illustrative example VPD chip 236 represents a plurality of VPD chips and not just the same VPD chip. Also, it should be noted that not all components in data processing system 200, such as fan 214 and fan 216, include a VPD chip.

In addition, backplane 206, processor card 208, processor card 218, SP card 210, GX card 212, fan 214, fan 216, and DIMMs 220, 222, 224, 226, 228, and 230 all include light emitting diode (LED) display 238. In other words, each FRU in data processing system 200 may include LED display 238. LED display 238 is a display comprised of LEDs for displaying data to a user or technician of data processing system 200. For example, LED display 238 may display data, such as where to plug-in components in an FRU. In addition, LED display 238 may display service functions for the FRU. Also, LED display 238 will not display conditional entries, such as conditional entry 232, unless the components are actually present in data processing system 200.

Illustrative embodiments use a set of tables in firmware 234, which define all possible resources or FRUs that may be present in data processing system 200. Firmware 234 selects the set of tables based on the machine type of data processing system 200. The set of tables includes RLCA table 240 and PD table 242. However, it should be noted that illustrative embodiments may also include other tables, such as a hardware VPD address table (HVAT), within the set of tables.

RLCA table 240 is a hierarchical representation that defines parent/child relationships of all possible resources within data processing system 200. All possible resources include any optional or conditional resources, such as DIMMs 224 and 226, which comprise conditional entry 232. RLCA table 240 includes one entry for each possible resource that may be found in data processing system 200. In addition, within each entry in RLCA table 240 is an indication as to whether a resource includes VPD chip 236.

PD table 242 contains information on how to determine if a resource or FRU is present in data processing system 200. PD table 242 includes one entry for each resource with an associated VPD chip. In addition, each entry in PD table 242 indicates what mechanism is used to do presence detection for the resource and the detailed information needed to access the resource. SP card 210 uses firmware 234 to perform the presence detection function. This presence detection function returns one of three results: 1) resource is present in system; 2) resource is not present in system; or 3) unable to determine if resource is present in system. During VPD collection and recollection, SP card 210 uses PD table 242 to determine if a resource is present in data processing system 200. If the resource is present in data processing system 200, then SP card 210 reads VPD chip 236 on that particular resource.

Device tree 244 also is a hierarchical representation that shows parent/child relationships of all resources or FRUs actually present in data processing system 200. SP card 210 creates device tree 244 while collecting initial resource VPD during a genesis boot. SP card 210 then caches device tree 244 in firmware 234. Subsequently, SP card 210 updates device tree 244 while recollecting resource VPD during IPL. Afterward, SP card 210 presents updated device tree 244 to an OS software stack that is executing on processor card 208 or optionally installed processor card 218.

SP card 210 begins VPD collection by using RLCA 240 and PD table 242, which are selected based on the machine type of data processing system 200. SP card 210 achieves a standby state only after completing collection of all resource VPD in data processing system 200. After reaching this standby state, SP card 210 has created device tree 244, which represents all resources actually present in data processing system 200.

Further, while in this SP card 210 standby state the main power has not yet been applied to data processing system 200. As a result, many of the resources may be removed from or added to data processing system 200 while at SP card 210 standby. From this standby state, data processing system 200 may be powered on and the IPL performed.

SP card 210 performs VPD recollection when the user or technician initiates a power on of data processing system 200. Because resources may have been added or removed while at standby, it is possible that device tree 244 is no longer a true representation resources actually present in data processing system 200. Thus, VPD recollection is necessary.

The only entries in RLCA table 240, which need further VPD processing, are those entries for resources that may have been plugged into or unplugged from data processing system 200 at SP card 210 standby. By the end of the VPD recollection process, device tree 244 is updated to reflect the current resource configuration of data processing system 200. This updated device tree 244 is then presented to the OS running on processor card 208 or optionally installed processor card 218.

With reference now to FIG. 3, a block diagram of a data processing system with two enclosures optionally coupled together is depicted in accordance with an illustrative embodiment. Data processing system 300 may, for example, be implemented in data processing system 200 of FIG. 2. Data processing system 300 includes enclosure 302 and enclosure 304.

Enclosure 302 includes backplane 306. Backplane 306 includes processor card 308, SP card 310, GX card 312, fan 314, and fan 316, such as backplane 206 includes processor card 208, SP card 210, GX card 212, fan 214, and fan 216 in FIG. 2. In addition, backplane 306 also includes multi-enclosure connectors 318. Multi-enclosure connectors 318 electrically connect enclosure 302 to another enclosure, such as enclosure 304. However, it should be noted that illustrative embodiments do not require enclosure 302 to be electrically connected to another enclosure. Enclosure 302 is optionally connected to enclosure 304 in this example via cables 320.

Enclosure 304 includes backplane 322. Backplane 322 includes processor card 324, GX card 326, fan 328, and fan 330. In addition, backplane 322 also includes multi-enclosure connectors 332. It should be noted that backplane 322 does not include an SP card, such as SP card 310 on backplane 306. In this example, backplane 306 shares the functionality of SP card 310 with backplane 322 via cables 320.

Figure 4:
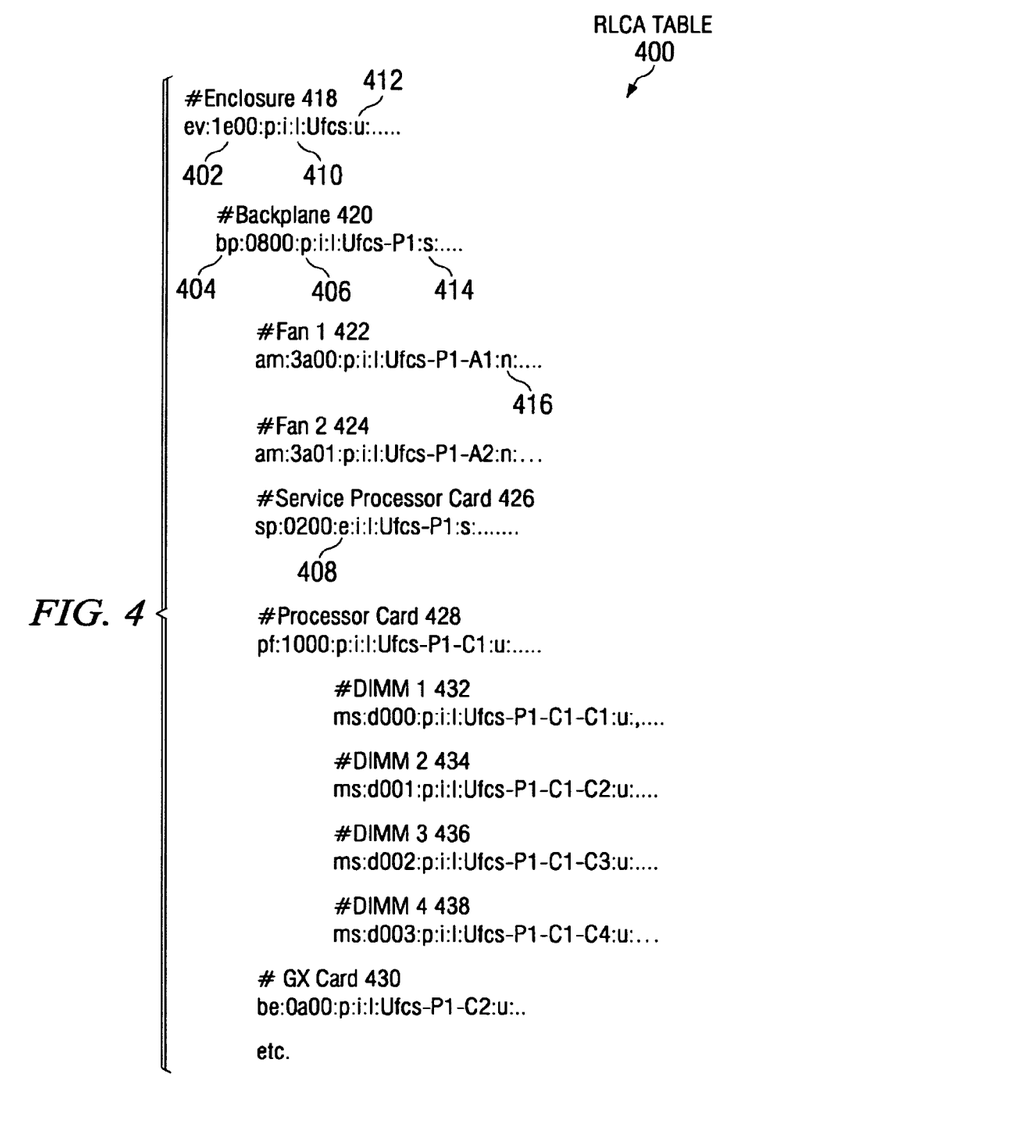
FIG. 4 is an exemplary illustration of an RLCA table that does not include a conditional entry in accordance with an illustrative embodiment.

With reference now to FIG. 4, an exemplary illustration of an RLCA table that does not include a conditional entry is depicted in accordance with an illustrative embodiment. RLCA table 400 may, for example, be RLCA table 240 in FIG. 2. RLCA table 400 is an example of an RLCA table that does not contain any conditional entries.

RLCA table 400 defines all the possible resources that may be in a data processing system, such as data processing system 200 in FIG. 2. In addition, RLCA table 400 assigns a unique resource ID (RID) number, such as RID number 402, to each resource entry. An FRU, such as FRU 204 in FIG. 2, may include one or more resources. In the case where an FRU only includes a single resource, a one-to-one relationship exists between RID number 402 for a resource and an FRU VPD. In the case where an FRU includes multiple resources, such as a backplane 206 that contains embedded SP card 210 in FIG. 2, one RID number exists for each of the resources, but these multiple RID numbers are associated with only a single FRU VPD, such as a single part number (PN) and serial number (SN). This type of multiple resource FRU includes one or more VPD chips, such as VPD chip 236 in FIG. 2. However, if more than one VPD chip exists on the FRU, then all the VPD chips will contain the same FRU PN and SN values.

RLCA table 400 shows the parent/child structure of the resources within the data processing system. This parent/child relationship is shown by the use of indentation in RLCA table 400. Each resource entry includes RID number 402, a two-character resource type, such as resource type 404, an indication of whether this resource is a physical FRU, which is indicated by a :p: tag, such as :p: tag 406, or whether the resource is embedded on a parent FRU, which is indicated by an :e: tag, such as :e: tag 408. An :l: tag, such as :l: tag 410, in an entry defines the location code for a resource. A :u: tag, such as :u: tag 412, in an entry indicates that a unique VPD chip is associated with the resource. An :s: tag, such as :s: tag 414, in an entry indicates that the resource uses the same VPD chip as its parent. An :n: tag, such as :n: tag 416, in an entry indicates that the resource does not have VPD chip that can be read by the SP.

In this example, RLCA table 400 contains an entry for enclosure 418. The entry for enclosure 418 includes an entry for backplane 420. The entry for backplane 420 includes entries for fan 1 422, fan 2 424, SP card 426, processor card 428, and GX card 430. The entry for processor card 428 includes entries for DIMM 1 432, DIMM 2 434, DIMM 3 436, and DIMM 4 438. As a result, RLCA table 400 reflects the resource configuration of data processing system 200 in FIG. 2.

Figure 5:
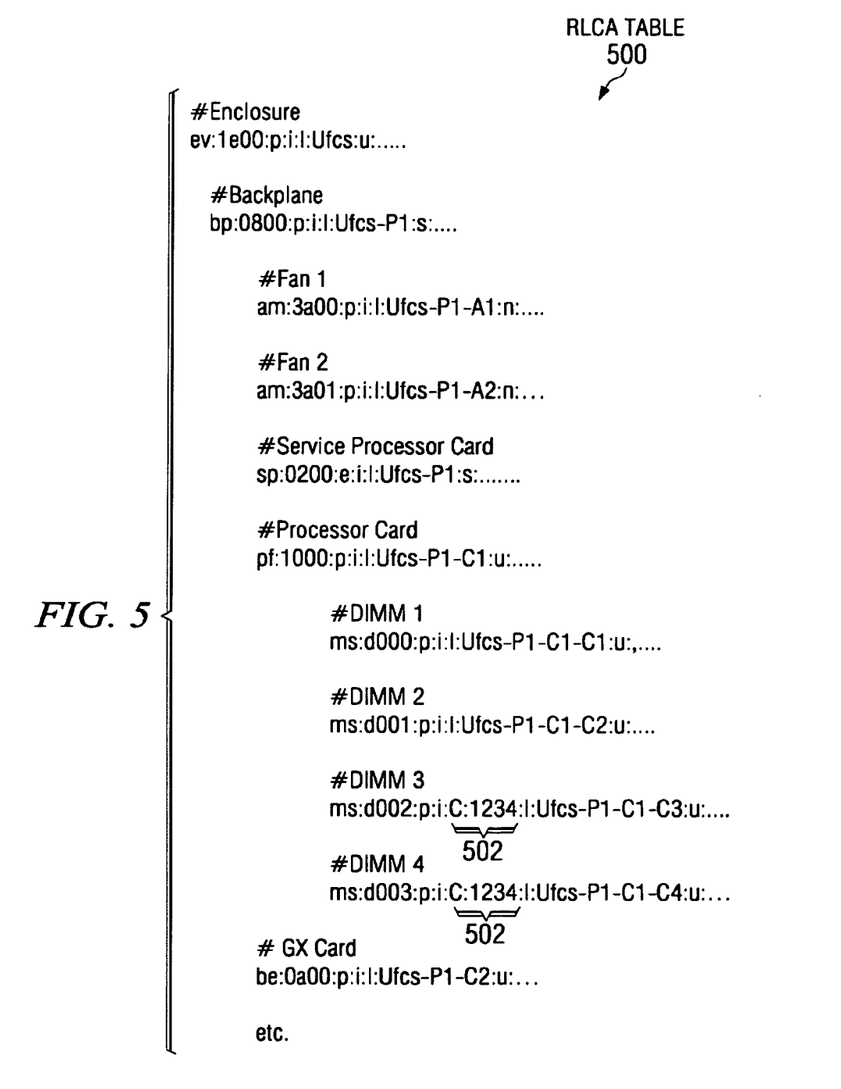
FIG. 5 is an exemplary illustration of an RLCA table that includes a type 1 conditional entry in accordance with an illustrative embodiment.

With reference now to FIG. 5, an exemplary illustration of an RLCA table that includes a type 1 conditional entry is depicted in accordance with an illustrative embodiment. RLCA table 500 may, for example, be RLCA table 400 in FIG. 4. RLCA table 500 is an example of an RLCA table that contains a type 1 conditional entry. A type 1 conditional entry for a resource is an entry that is included in a resulting device tree only when a CCIN of the resource's parent resource is listed in the conditional entry.

For example, suppose a particular model of a data processing system has two different versions of a processor card that may be installed on that particular model. The processor card version with a CCIN that is equal to 1234 includes 4 DIMM slots, such as processor card 208 with DIMMs 220, 222, 224, and 226 in FIG. 2. The processor card version with a CCIN that is equal to 5678 includes only 2 DIMM slots, such as processor card 218 with DIMMs 228 and 230 in FIG. 2. Illustrative embodiments change RLCA table 500 to add conditional entries for DIMMs 3 and 4, such as conditional entry 232 for DIMMs 224 and 226 in FIG. 2. :C:1234: 502 within the resource entry indicates to the firmware code in the SP, which is processing RLCA table 500, that this particular entry is to be added to the resulting device tree only if the CCIN of the processor card is equal to 1234. Otherwise, the resulting device tree will only shows 2 DIMM slots. Also, it should be noted that illustrative embodiments may list the :C:<CCIN>, which is shown as :C:1234 above, as :C:<list of one or more CCINs separated by commas>.

Figure 6:
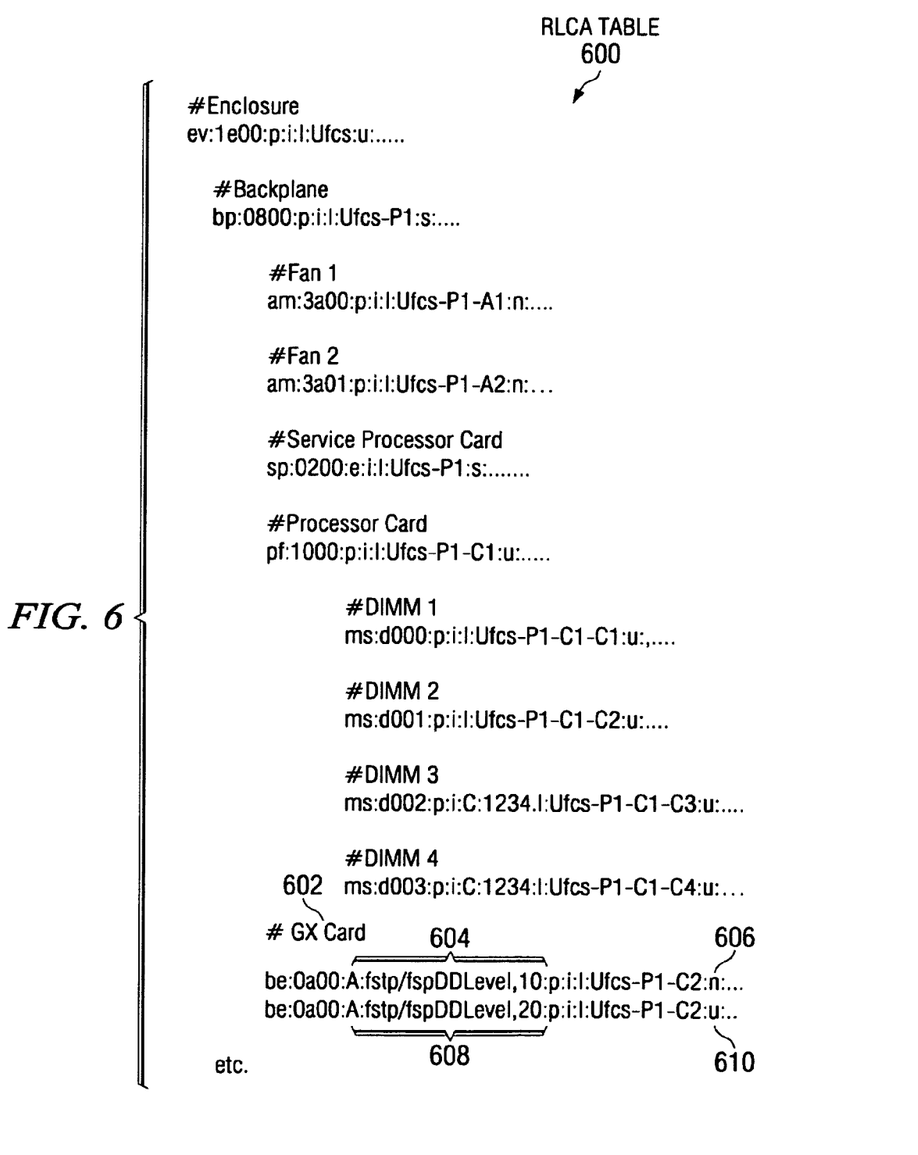
FIG. 6 is an exemplary illustration of an RLCA table that includes a type 2 conditional entry in accordance with an illustrative embodiment.

With reference now to FIG. 6, an exemplary illustration of an RLCA table that includes a type 2 conditional entry is depicted in accordance with an illustrative embodiment. RLCA table 600 may, for example, be RLCA table 500 in FIG. 5. RLCA table 600 is an example of an RLCA table that contains a type 2 conditional entry. A type 2 conditional entry for a resource is an entry that is included in the resulting device tree only when the value of a specified entry in the SP's registry is greater than or equal to the value in the conditional statement.

For example, suppose an earlier hardware version of an SP card, such as SP card 210 in FIG. 2, does not support a connection to a VPD chip on a GX card, such as VPD chip 236 on GX card 212 in FIG. 2. As the firmware, such as firmware 234 in FIG. 2, builds the device tree, such as device tree 244 in FIG. 2, the firmware builds the device tree without GX card VPD if the data processing system includes the earlier hardware version of the SP card. Alternatively, the firmware builds the device tree with the GX card VPD if the data processing system includes a later hardware version of the SP card. The version of the SP card or any other resource may, for example, be determined by a date, such as 2000 or 2008, of the resource version.

The firmware building the device tree is running on the SP. An entry in the SP's registry will indicate the SP's hardware version level. In this example, the SP's registry entry for the hardware version level is named fstp/fspDDLevel.

Also in this example, two conditional entries are needed for GX card 602. The first conditional entry is for SP hardware version level 10, such as :A:fstp/fspDDLevel,10 604, which indicates that the entry does not include VPD for GX card 602. An :n: tag, such as :n: tag 606, in the entry indicates that the resource does not have a VPD chip that can be read by the SP card. Illustrative embodiments utilize the :n: tag so that the firmware will not send an error message because the firmware was not able to access the a VPD chip on GX card 602. The second conditional entry is for SP hardware version level 20, such as :A:fstp/fspDDLevel,20 608, which indicates that the entry does include VPD for GX card 602. A :u: tag, such as :u: tag 610, in the entry indicates that a unique VPD chip is associated with the resource.

Figure 7:
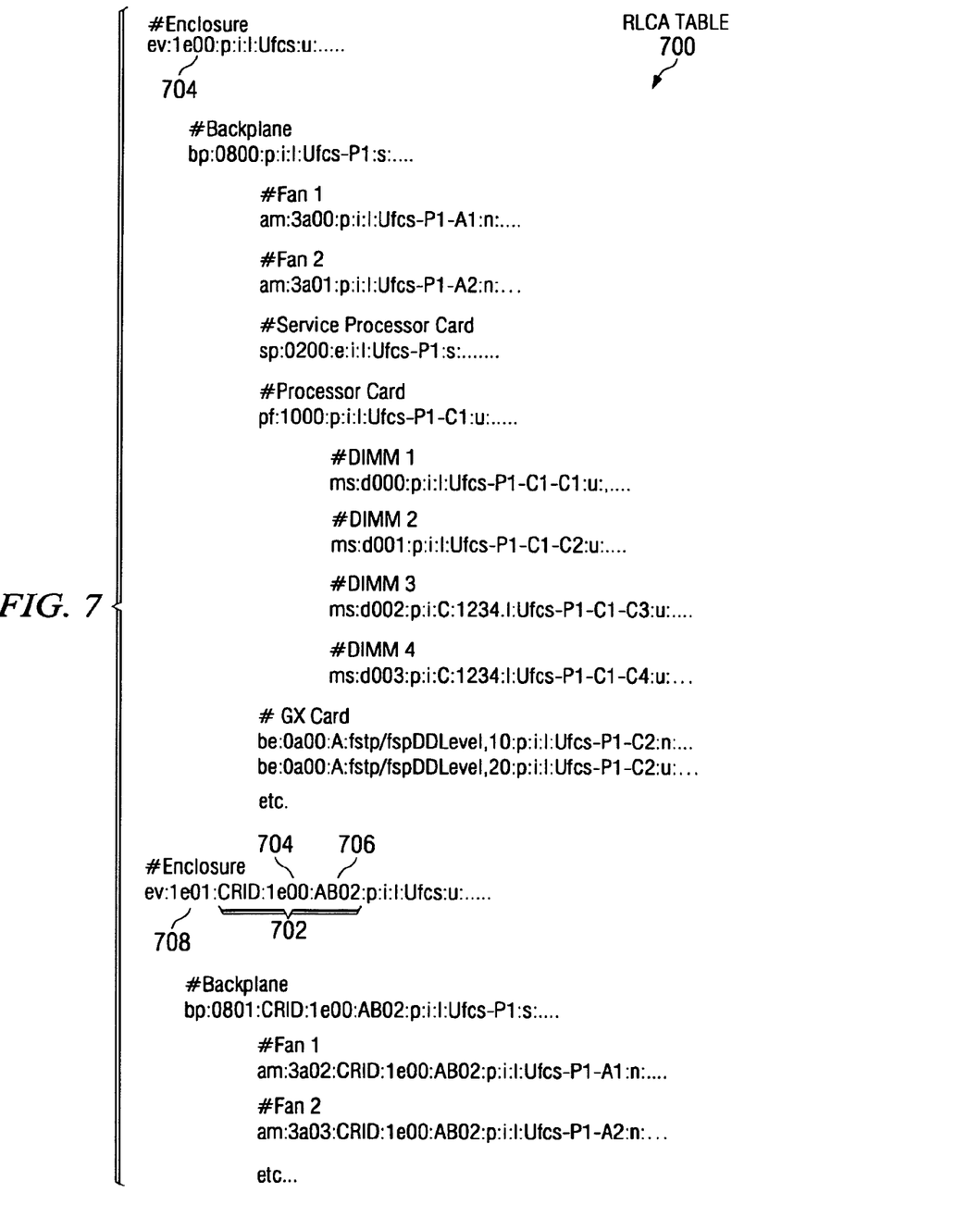
FIG. 7 is an exemplary illustration of an RLCA table that includes a type 3 conditional entry.

With reference now to FIG. 7, an exemplary illustration of an RLCA table that includes a type 3 conditional entry is depicted in accordance with an illustrative embodiment. RLCA table 700 may, for example, be an extension of RLCA table 600 in FIG. 6. RLCA table 700 is an example of an RLCA table that contains a type 3 conditional entry. A type 3 conditional entry for a resource is an entry that is included in the resulting device tree only when the CCIN of a specified RID is listed in the conditional entry.

For example, suppose a data processing system, such as data processing system 300 in FIG. 3, is defined to include a base enclosure, such as enclosure 302 in FIG. 3. In addition, suppose that specific base enclosure versions may electrically connect to a second enclosure, such as enclosure 304 in FIG. 3. Furthermore, suppose that a base enclosure with a CCIN equal to AB01 cannot connect to a second enclosure and a base enclosure with a CCIN equal to AB02 can connect to a second enclosure. The addition of a conditional resource ID (CRID), which is formatted as :CRID:<RID>:<CCIN>:, to a base enclosure entry indicates the RID whose CCIN is to be checked against the list of optional base enclosure versions. Further, it should be noted that illustrative embodiments may also list the :CRID:<RID>:<CCIN> as :CRID:<RID>:<list of one or more CCINs separated by commas>. In this example, the addition of :CRID:1e00:AB02: 702 to the base enclosure ev:1e01 708 entry indicates RID 1e00 704 whose CINN AB02 706 is to be checked against the list of optional base enclosure versions. As a result, base enclosure entries beginning with ev:1e01 will only be included in the resulting device tree if the CCIN for RID 1e00 is equal to AB02.

Figure 8:
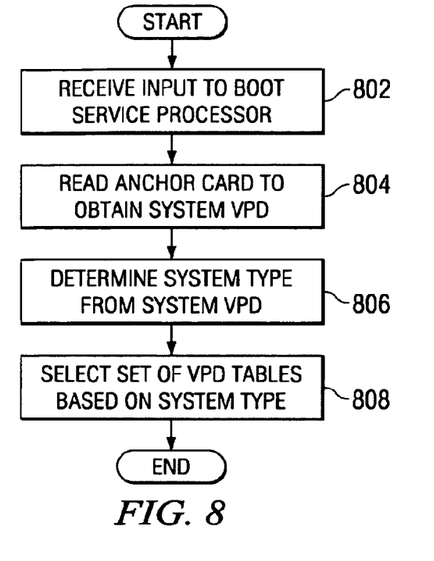
FIG. 8 is a flowchart illustrating an exemplary process for collecting system VPD in accordance with an illustrative embodiment; and FIG. 9A

With reference now to FIG. 8, a flowchart illustrating an exemplary process for collecting system VPD is shown in accordance with an illustrative embodiment. The process shown in FIG. 8 may be implemented in an SP, such as SP card 210 in FIG. 2.

The process begins when the SP receives an input to boot (step 802). Then, the SP reads an anchor card, such as anchor card 112 in FIG. 1, to obtain system VPD, such as the system type, model number, and serial number, of a data processing system, such as data processing system 100 in FIG. 1 (step 804). Afterward, the SP determines the system type of the data processing system from the system VPD (step 806). Subsequently, the SP selects a set of VPD tables, such as RLCA table 240 and PD table 242 in FIG. 2, based on the determined system type of the data processing system (step 808). The process completes thereafter.

Figure 9A:
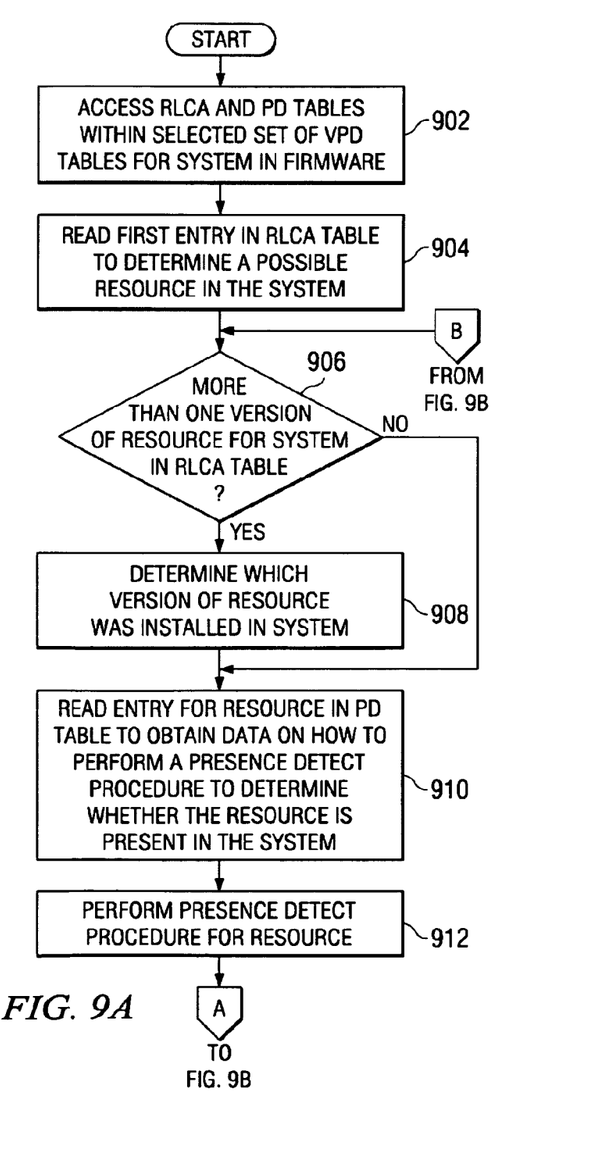

With reference now to FIG. 9A and FIG. 9B, a flowchart illustrating an exemplary process for creating a device tree that includes optional versions of a resource is shown in accordance with an illustrative embodiment. The process shown in FIGS. 9A and 9B may be implemented in an SP, such as SP card 210 in FIG. 2.

The process begins when the SP accesses an RLCA table and a PD table in firmware, such as RLCA table 240 and PD table 242 in firmware 234 in FIG. 2, which the SP selected from a set of tables in step 808 in FIG. 8 for the data processing system based on machine type (step 902). Then, the SP reads the first entry in the RLCA table to determine a possible resource in the data processing system (step 904).

Then, the SP makes a determination as to whether more than one version of the resource exists for the data processing system in the RLCA table (step 906). If more than one version of the resource does not exist for the data processing system in the RLCA table, no output of step 906, then the process proceeds to step 910. If more than one version of the resource does exist for the data processing system in the RLCA table, yes output of step 906, then the SP makes a determination as to which version of the resource was installed in the data processing system (step 908). Then, the SP reads an entry in the PD table to obtain data on how to perform a presence detect procedure to determine whether the resource is present in the data processing system (step 910).

Then, the SP performs the presence detect procedure for the resource (step 912). Subsequently, the SP makes a determination as to whether the resource is present in the data processing system (step 914). If the resource is not present in the data processing system, no output of step 914, then the process proceeds to step 922. If the resource is present in the data processing system, yes output of step 914, then the SP creates an entry for the resource in a device tree, such as device tree 244 in FIG. 2, based on the version determined in step 908 (step 916).

Then, the SP makes a determination as to whether a VPD chip, such as VPD chip 236 in FIG. 2, is present in the resource (step 918). If a VPD chip is not present in the resource, no output of step 918, then the process proceeds to step 922. If a VPD chip is present in the resource, yes output of step 918, then the SP reads the VPD chip to obtain VPD for the resource and adds the VPD for the resource to the entry in the device tree (step 920).

Then, the SP makes a determination as to whether another entry in the RLCA table exists (step 922). If another entry in the RLCA table does exist, yes output of step 922, then the SP reads the next entry in the RLCA table (step 924). Thereafter, the process returns to step 906. If another entry in the RLCA table does not exist, no output of step 922, then the SP caches the created device tree in the firmware (step 926). Subsequently, the SP enters a standby state (step 928). The process completes thereafter.

Thus, illustrative embodiments provide a computer implemented method, system, and computer program product for creating a device tree for a data processing system that includes optional versions of resources as conditional entries. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for creating a device tree, the computer implemented method comprising:
   determining, by a service processor, whether more than one version of a hardware resource for a data processing system exists in a resource location code array table, wherein the hardware resource is one of a plurality of hardware resources, and wherein the resource location code array table includes different types of conditional entries for different versions of the hardware resource;
   responsive to the service processor determining that more than one version of the hardware resource for the data processing system does exist in the resource location code array table, determining, by the service processor, which version of the hardware resource was installed in the data processing system;
   performing, by the service processor, a presence detection procedure for the hardware resource in the data processing system;
   determining, by the service processor, whether the hardware resource is present in the data processing system;
   responsive to the service processor determining that the hardware resource is present in the data processing system, creating, by the service processor, an entry in the device tree for the hardware resource based on the version of the hardware resource, wherein a type one conditional entry for the hardware resource in the resource location code array table is included in the device tree only when an identification number of a parent hardware resource for the hardware resource is listed within the type one conditional entry, and wherein a type two conditional entry for the hardware resource in the resource location code array table is included in the device tree only when a hardware version level of the service processor specified in a registry of the service processor is greater than or equal to a service processor hardware version level listed within the type two conditional entry, and wherein a type three conditional entry for the hardware resource in the resource location code array table is included in the device tree only when a resource identification number of a specified hardware resource in a list of optional hardware resource versions is listed within the type three conditional entry, and wherein each hardware resource in the plurality of hardware resources of the data processing system in the resource location code array table is assigned a unique resource identification number; and caching, by the service processor, the device tree in firmware located in the service processor.

2. The computer implemented method of claim 1, further comprising:

responsive to the service processor receiving an input to boot the service processor prior to an initial program load at power on of the data processing system, reading, by the service processor, an anchor card to obtain vital product data for the data processing system;

determining, by the service processor, a data processing system type from the vital product data for the data processing system; and selecting, by the service processor, a set of vital product data tables in the firmware based on the data processing system type to form a selected set of vital product data tables, wherein the selected set of vital product data tables includes the resource location code array table and a presence detect table.

3. The computer implemented method of claim 2, further comprising:

responsive to the service processor accessing the resource location code array table and the presence detect table in the firmware, reading, by the service processor, an entry in the resource location code array table to determine a possible hardware resource in the data processing system; and reading, by the service processor, an entry in the presence detect table associated with the possible hardware resource to obtain data on how to perform the presence detection procedure.

4. The computer implemented method of claim 1, further comprising:

determining, by the service processor, whether a vital product data chip is present in the hardware resource;

responsive to the service processor determining that the vital product data chip is present in the hardware resource, reading, by the service processor, the vital product data chip to obtain vital product data for the hardware resource; and adding, by the service processor, the vital product data to the entry in the device tree for the hardware resource.

5. The computer implemented method of claim 1, further comprising:

responsive to the service processor caching the device tree in the firmware, entering, by the service processor, a standby state.

6. The computer implemented method of claim 1, wherein the resource location code array table is a hierarchical representation of parent/child relationships of all possible hardware resources that could be present in the data processing system.

7. The computer implemented method of claim 1, wherein the different types of conditional entries for the different versions of the hardware resource are also incorporated into other tables, and wherein the other tables include a hardware vital product data address table, a presence detect table, and a light emitting diode control table.

8. The computer implemented method of claim 1, wherein the device tree is a hierarchical representation of parent/child relationships of all hardware resources that are present in the data processing system.

9. The computer implemented method of claim 1, wherein each of the plurality of hardware resources listed in the resource location code array table includes a light emitting diode display that displays data.

10. A data processing system for creating a device tree, comprising:

a bus system;

a storage device connected to the bus system, wherein the storage device stores a set of instructions;

a processor unit connected to the bus system; and a service processor unit connected to the bus system, wherein the service processor unit executes the set of instructions to determine whether more than one version of a hardware resource for the data processing system exists in a resource location code array table, wherein the hardware resource is one of a plurality of hardware resources, and wherein the resource location code array table includes different types of conditional entries for different versions of the hardware resource; determine which version of the hardware resource was installed in the data processing system in response to determining that more than one version of the hardware resource for the data processing system does exist in the resource location code array table; perform a presence detection procedure for the hardware resource in the data processing system; determine whether the hardware resource is present in the data processing system; create an entry in the device tree for the hardware resource based on the version of the hardware resource in response to determining that the hardware resource is present in the data processing system, wherein a type one conditional entry for the hardware resource in the resource location code array table is included in the device tree only when an identification number of a parent hardware resource for the hardware resource is listed within the type one conditional entry, and wherein a type two conditional entry for the hardware resource in the resource location code array table is included in the device tree only when a hardware version level of the service processor specified in a registry of the service processor is greater than or equal to a service processor hardware version level listed within the type two conditional entry, and wherein a type three conditional entry for the hardware resource in the resource location code array table is included in the device tree only when a resource identification number of a specified hardware resource in a list of optional hardware resource versions is listed within the type three conditional entry, and wherein each hardware resource in the plurality of hardware resources of the data processing system in the resource location code array table is assigned a unique resource identification number; and cache the device tree in firmware located in the service processor.

11. The data processing system of claim 10, wherein each of the plurality of hardware resources listed in the resource location code array table includes a light emitting diode display that displays data.

12. The data processing system of claim 10, wherein the service processor unit further executes the set of instructions to read an anchor card to obtain vital product data for the data processing system in response to receiving an input to boot the service processor unit prior to an initial program load at power on of the data processing system; determine a data processing system type from the vital product data for the data processing system; and select a set of vital product data tables in the firmware based on the data processing system type to form a selected set of vital product data tables, wherein the selected set of vital product data tables includes the resource location code array table and a presence detect table.

13. The data processing system of claim 10, wherein the service processor unit further executes the set of instructions to read an entry in the resource location code array table to determine a possible hardware resource in the data processing system in response to accessing the resource location code array table and the presence detect table in the firmware; and read an entry in the presence detect table associated with the possible hardware resource to obtain data on how to perform the presence detection procedure.

14. A computer program product stored in a non-transitory computer-readable storage medium having computer-usable program code embodied therein that is executable by a data processing system for creating a device tree, the computer program product comprising:
    computer-usable program code for determining whether more than one version of a hardware resource for the data processing system exists in a resource location code array table, wherein the hardware resource is one of a plurality of hardware resources, and wherein the resource location code array table includes different types of conditional entries for different versions of the hardware resource;
    computer-usable program code for determining which version of the hardware resource was installed in the data processing system in response to determining that more than one version of the hardware resource for the data processing system does exist in the resource location code array table;
    computer-usable program code for performing a presence detection procedure for the hardware resource in the data processing system;
    computer-usable program code for determining whether the hardware resource is present in the data processing system;
    computer-usable program code for creating an entry in the device tree for the hardware resource based on the version of the hardware resource in response to determining that the hardware resource is present in the data processing system, wherein a type one conditional entry for the hardware resource in the resource location code array table is included in the device tree only when an identification number of a parent hardware resource for the hardware resource is listed within the type one conditional entry, and wherein a type two conditional entry for the hardware resource in the resource location code array table is included in the device tree only when a hardware version level of a service processor specified in a registry of the service processor is greater than or equal to a service processor hardware version level listed within the type two conditional entry, and wherein a type three conditional entry for the hardware resource in the resource location code array table is included in the device tree only when a resource identification number of a specified hardware resource in a list of optional hardware resource versions is listed within the type three conditional entry, and wherein each hardware resource in the plurality of hardware resources of the data processing system in the resource location code array table is assigned a unique resource identification number; and
    computer-usable program code for caching the device tree in firmware located in the service processor.

15. The computer program product of claim 14, further comprising:
    computer-usable program code for reading an anchor card to obtain vital product data for the data processing system in response to receiving an input to boot the service processor prior to an initial program load at power on of the data processing system;
    computer-usable program code for determining a data processing system type from the vital product data for the data processing system; and
    computer-usable program code for selecting a set of vital product data tables in the firmware based on the data processing system type to form a selected set of vital product data tables, wherein the selected set of vital product data tables includes the resource location code array table and a present presence detect table.

16. The computer program product of claim 15, further comprising:
    computer-usable program code for reading an entry in the resource location code array table to determine a possible hardware resource in the data processing system in response to accessing the resource location code array table and the presence detect table in the firmware; and
    computer-usable program code for reading an entry in the presence detect table associated with the possible hardware resource to obtain data on how to perform the presence detection procedure.

17. The computer program product of claim 14, further comprising:
    computer-usable program code for determining whether a vital product data chip is present in the hardware resource;
    computer-usable program code for reading the vital product data chip to obtain vital product data for the hardware resource in response to determining that the vital product data chip is present in the hardware resource; and
    computer-usable program code for adding the vital product data to the entry in the device tree for the hardware resource.

18. The computer program product of claim 14, further comprising:
    computer-usable program code for entering a standby state in to response to caching the device tree in the firmware.

19. The computer program product of claim 14, wherein each of the plurality of hardware resources listed in the resource location code array table includes a light emitting diode display that displays data.

* * * * *